United States Patent Office 3,222,421
Patented Dec. 7, 1965

3,222,421
POLYESTER RESINOUS COMPOSITIONS
Lennart A. Lundberg, Stamford, Conn., assignor to American Cyanamid Company, New York, N.Y., a corporation of Maine
No Drawing. Filed Dec. 1, 1961, Ser. No. 156,527
14 Claims. (Cl. 260—872)

This invention relates to novel thermosetting polyester resinous compositions, to products prepared therefrom, and to methods of producing said compositions and products. More particularly, this invention relates to novel thermosetting polyester resinous compositions modified by the incorporation therein of specific amounts of certain polyglycol diacrylates and dimethacrylates, as will be described in greater detail hereinbelow, which, when cured, provide thermoset polyester resins having improved toughness.

The general class of thermosetting polyester resinous compositions and thermoset products derived therefrom with which the present invention is concerned is well known in the art. Said thermoset products have been generically described as substantially insoluble and infusible resinous reaction products resulting from the conjoint polymerization of an ethylenically unsaturated cross-linking material, generally one which comprises a major amount of an ethylenically unsaturated monomeric cross-linking agent containing a $CH_2=C<$ group, such as styrene, with a reactive, ethylenically unsaturated, essentially linear polyester resin, which is usually referred to as a reactive or polymerizable polyester resin. This reactive polyester resin is, in turn, usually obtained by condensing an $\alpha,\beta$-ethylenically unsaturated polycarboxylic acid or anhydride, and particularly a dicarboxylic acid or anhydride such as maleic anhydride, with a polyol, generally a saturated dihydric alcohol such as ethylene glycol.

The many excellent properties possessed by conventional thermosetting polyester resinous compositions and the cured or thermoset polyester resins obtained therefrom have led to their widespread use in such diverse applications as laminates, adhesives, surface coatings, filled and unfilled molded and cast articles, and the like, and particularly in the first two fields stated. Nevertheless, there remains considerable room for improvement in certain properties of polyester resins which have heretofore limited the use of these resins for many important applications. For example, there is a growing need in industry for polyester resins having a degree of toughness, i.e., impact strength or shock resistance, as manifested by improved room temperature tensile strength, elongatibility and flexural strength, over and above that which can be obtained from known polyester resins. Polyester resins prepared according to the practice of the present invention enable one to realize this improvement, particularly when they are used in such applications as reinforced auto body components, truck panels, boats, equipment housings, and the like, where toughness is of prime importance.

I have now discovered that thermoset polyester resins having improved toughness can be obtained by employing, as part of the ethylenically unsaturated monomeric cross-linking material in thermosetting polyester resinous compositions, a monomeric diacrylate or dimethacrylate ester of a polyglycol corresponding to the general formula:

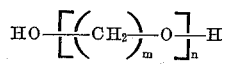

wherein $m$ is an integer of from 2 to 3 and $n$ is a number such that the average molecular weight of said polyglycol is from about 350 to about 850, e.g., in the case of the polyethylene glycols $n$ is from about 7 to about 18, while for the polypropylene glycols $n$ is from about 5 to about 13.

It is, therefore, an object of my invention to provide novel thermosetting polyester resinous compositions.

It is also an object of my invention to utilize mixtures of ethylenically unsaturated cross-linking materials containing specific amounts of certain polyglycol diacrylates and dimethacrylates as novel polymerizable components of thermosetting polyester resinous compositions, wherein said mixtures serve as copolymerizates capable of imparting beneficial properties to the thermoset polyester resins prepared therefrom.

A further object of my invention is to provide novel thermosetting polyester resinous compositions which, when cured, provide substantially insoluble and infusible polyester resins having improved toughness.

These and other objects of my invention will be readily apparent to those skilled in the art, especially upon consideration of the detailed discussion and examples set forth hereinbelow.

The reactive polyester resins employed in the practice of the present invention are well known in the art. They are obtained by reacting polycarboxylic acids, or their anhydrides, with polyhydric alcohols, at least one of these reactants being one which contains $\alpha,\beta$-ethylenic unsaturation, to produce water-insoluble resinous, essentially linear esterification or condensation products containing a plurality of ethylenically unsaturated linkages distributed along the backbones of their polymer chains.

The use of $\alpha,\beta$-ethylenically unsaturated polycarboxylic acids provides a convenient method of introducing ethylenic unsaturation into the reactive polyester resins. I prefer to employ $\alpha,\beta$-ethylenically unsaturated dicarboxylic acids, such as maleic, fumaric, monochloro- and monobromomaleic, monochloro- and monobromofumaric, citraconic, $\gamma,\gamma$-dimethylcitraconic, mesaconic, itaconic, $\alpha$-methylitaconic, $\gamma$-methylitaconic, teraconic, and the like, as well as mixtures thereof, but I may also employ minor amounts of $\alpha,\beta$-ethylenically unsaturated polycarboxylic acids containing three or more carboxyl groups, such as aconitic acid and the like, together with the particular $\alpha,\beta$-ethylenically unsaturated dicarboxylic acid or acids chosen.

Similarly, non-polymerizable polycarboxylic acids, i.e., acids which are saturated or which contain only benzenoid unsaturation, such as oxalic, malonic, succinic, monochloro- and monobromomalonic, $\alpha,\beta$-dichloro- and -dibromosuccinic, glutaric, adipic, pimelic, suberic, azelaic, sebacic, malic, tartaric, tricarballylic, citric, phthalic, isophthalic, terephthalic, cyclohexanedicarboxylic, endomethylenetetrahydrophthalic, hexachloroendomethylenetetrahydrophthalic, and the like, as well as mixtures thereof, may also be employed, if used in combination with one or more of the aforementioned $\alpha,\beta$-ethylenically unsaturated polycarboxylic acids. The use of non-polymerizable polycarboxylic acids is oftentimes desirable, in that acids of this type may be employed to impart many beneficial properties to the thermoset resins. Where such non-polymerizable polycarboxylic acids are employed, the amount thereof should constitute at least about 20% but not more than about 80% of the total equivalents of carboxyl groups present in the esterification mixture. Preferably, such non-polymerizable polycarboxylic acids will be employed in amounts ranging from about 25% to about 75% of the total equivalents of carboxyl groups present in the esterification mixture.

Whenever available, the anhydrides of any of the aforementioned $\alpha,\beta$-ethylenically unsaturated polycarboxylic acids and non-polymerizable polycarboxylic acids may be substituted for said acids in whole or in part.

Any of the large class of polyhydric alcohols ordinarily used in preparing reactive polyester resins may be employed for this purpose in the practice of the present invention. While dihydric alcohols, and especially saturated aliphatic diols, are preferred as coreactants in the preparation of the reactive polyester resins, it is not mandatory that all of the polyol used be of this type, in that small amounts, e.g., usually up to about 10% of the total equivalents of hydroxyl groups present in the esterification mixture, of polyols having more than two hydroxyl groups may also be employed. Among the dihydric alcohols which may be employed are saturated aliphatic diols such as ethylene glycol, propylene glycol, diethylene glycol, dipropylene glycol, triethylene glycol, tetraethylene gycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts together with the above-mentioned diols are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

The esterification mixtures from which the reactive polyester resins employed in the practice of the present invention are prepared are generally formulated so as to contain at least a stoichiometric balance between carboxyl and hydroxyl groups. Thus, where a diol and a dicarboxylic acid are employed, they are usually reacted on at least a mol to mol basis. In common commercial practice, which I prefer to follow, a small excess of polyol, usually in the range of from about 5% to about 15% excess, is employed. This is done primarily for economic reasons, e.g., to insure a rapid rate of esterification.

The reactive polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical, thus, the reaction will preferably be carried out at a temperature which usually will be just below the boiling point of the most volatile component of the reaction mixture, generally the polyol. However, temperatures in excess of the boiling point of the most volatile component may be employed if the reaction vessel is equipped with suitable condensing means, such as a steam-heated reflux condenser, which will permit water of esterification to escape from the reaction vessel while condensing volatilized reaction components and returning them to the reaction sphere. Similarly, pressures slightly above or below atmospheric pressure may be employed if desired.

The esterification mixture should be sufficiently reacted so as to ultimately produce a reactive polyester resin having an acid number not appreciably more than about 75. I prefer to employ reactive polyester resins having acid numbers ranging from about 30 to about 50.

Further details pertaining to the preparation of reactive polyester resins of the type employed in the practice of the present invention are disclosed in U.S. Patent No. 2,255,313, to Ellis, and in U.S. Patents Nos. 2,443,735 to 2,443,741, inclusive, to Kropa.

The ethylenically unsaturated cross-linking materials in my novel thermosetting polyester resinous compositions comprise, as previously indicated, monomeric diacrylate or dimethacrylate esters of polyethylene glycols and polypropylene glycols, the average molecular weights of said polyglycols ranging from about 350 to about 850.

Just as in the case of the aforementioned reactive polyester resins, the polyglycols coming within the scope of the above-recited definition, as well as suitable methods for their preparation, are well known in the art. They may be obtained, for example, by acid-catalyzed condensation of ethylene glycol or propylene glycol or by condensing ethylene oxide or propylene oxide either with themselves or with ethylene glycol or propylene glycol. The corresponding monomeric diacrylate and dimethacrylate esters are prepared by methods equally well known in the art, e.g., by esterifying the polyglycol with acrylic or methacrylic acid or by reacting the polyglycol with acrylyl or methacrylyl chloride in the presence of an acid acceptor such as trimethylamine. Obviously, mixtures of such polyglycols may be employed in preparing the corresponding monomeric diacrylate and dimethacrylate esters and, in most cases, will even be preferred, due to their ready availability. Polyglycols or mixtures of polyglycols wherein the average molecular weight ranges from about 400 to about 600, e.g., polyethylene glycol 400, polyethylene glycol 600, polypropylene glycol 400, polypropylene glycol 600, and the like, will preferably be used to prepare the monomeric diacrylate and dimethacrylate esters employed in the practice of the present invention.

The aforementioned diacrylate and dimethacrylate esters will be used in combination with one or more polymerizable, ethylenically unsaturated monomeric materials which have a $CH_2=C<$ group, contain not more than one ether linkage, and preferably have a boiling point, at atmospheric pressure, of at least 60° C. An illustrative but by no means exhaustive listing of such materials includes styrene; side-chain-substituted styrenes such as α-methylstyrene, α-ethylstyrene, and the like; ring-substituted styrenes such as the ring-substituted alkyl styrenes, e.g., o-methylstyrene, p-ethylstyrene, m-propylstyrene, 2,4-dimethylstyrene, 2,5-diethylstyrene, and the like; alkyl esters of acrylic and methacrylic acid, e.g., methyl, ethyl and butyl acrylate, methyl methacrylate, and the like; vinyl acetate, vinyl butyrate, vinyl laurate, acrylonitrile, methacrylonitrile, acrylamide, methacrylamide, unsaturated ethers such as phenyl vinyl ether and the like, and allyl compounds such as allyl acetate, allyl acrylate, allyl methacrylate, allyl α-hydroxyisobutyrate, allyl lactate, diallyl carbonate, diallyl ether, methallyl ethyl ether, diallyl oxalate, diallyl malonate, diallyl succinate, diallyl adipate, diallyl sebacate, diallyl tartrate, diallyl phthalate, diallyl endomethylenetetrahydrophthalate, diallyl mesaconate, diallyl citraconate, triallyl tricarballylate, triallyl trimesate, triallyl citrate, triallyl cyanurate, triallyl phosphate, trimethallyl phosphate, tetraallyl silane, tetraallyl silicate, hexaallyl disiloxane, and the like, as well as mixtures thereof.

The amount of polyglycol diacrylate or dimethacrylate employed in the thermosetting polyester resinous compositions of the present invention can range from about 5% to about 15% by weight, based on the total weight of polymerizable reactants present in said compositions, while the amount of other polymerizable monomeric materials having a $CH_2=C<$ group, e.g., styrene, can range from about 5% to about 55% by weight, based on the total weight of polymerizable reactants present. The amounts of polyglycol diacrylate or dimethacrylate and other cross-linking monomer or monomers will be regulated so that the total amount of ethylenically unsaturated cross-linking materail present will range from about 20% to about 60% by weight, based on the total weight of polymerizable reactants present.

In order to facilitate the copolymerization of the ethylenically unsaturated monomeric cross-linking material with the reactive polyester resin, it is preferred that a polymerization catalyst be present in the thermosetting polyester resinous composition at the time of its cure. The types and amounts of these catalytic materials which may be used are well known in the art, and any material which normally induces polymerization of conventional polyester resinous compositions can be utilized in the practice of the present invention. The optimum curing conditions are modified to some extent by the choice of the particular catalyst, and the amount thereof, to be used. A very active catalyst should be used in lower concentrations, and preferably at lower temperatures, than a less reactive material, but in general, the amount of polymerization catalyst, e.g., organic peroxide, that will be employed will generally range from about 0.5% to about 2% by weight, based on the total weight of polymerizable reactants present in the thermosetting polyester resinous composition. The preferred catalysts comprise a wide variety of organic peroixdes ("acidic peroxides") and hydroperoxides ("alcoholic peroxides") which are generically described as organic superoxides. Among the organic peroxide catalysts that may be employed are such as acetyl peroxide, benzoyl peroxide, substituted benzoyl peroxides, and particularly halogenated benzoyl peroxides such as p-bromobenzoyl peroxide, 2,4-dichlorobenzoyl peroxide, etc., benzoyl acetyl peroxide, phthalyl peroxide, succinyl peroxide, fatty oil acid peroxides, such as cocoanut oil peroxide, lauryl peroxide, stearyl peroxide, oleyl peroxide, anisoyl peroxide, toluyl peroxide, and the like. Organic peracids, such as peracetic acid and perbenzoic acid, may also be employed. Among the organic hydroperoxide catalysts that may be employed are such as tertiary butyl hydroperoxide, cumene hydroperoxide, diisopropyl benzene hydroperoxide, 1-hydroxycyclohexyl hydroperoxide, the terpene oxides, such as ascaridole, 1-p-menthane hydroperoxide, etc., and the like. Mixtures of peroxides and hydroperoxides, including commercially available mixtures such as methyl ethyl ketone peroixde, cyclohexane peroxide, and the like, are especially effective as catalysts. Various other types of polymerization catalysts may also be employed, for example, compounds such as aluminum chloride, stannic chloride, boron trifluoride, or the azotype catalysts such as $\alpha,\alpha'$-azobisisobutyronitrile.

Since the reactive components of my novel thermosetting polyester resinous compositions contain a high degree of polymerizable unsaturation, it is often desirable to incorporate a polymerization inhibitor therewith. The inhibitor, i.e., a material which will impart some measure of stability to the polymerizable mixture during any storage period encountered prior to curing and yet not affect the polymerization reaction once it has been initiated by the addition of catalyst or by heating, will be employed in amounts ranging from about 0.005% to about 0.1% by weight, based on the total weight of polymerizable, reactive components present in the thermosetting polyester resinous composition. Among the inhibitors that may be used are such materials as phenol, the monoalkyl phenols, such as ortho-, meta- and para-cresol, as well as mixtures of such isomers, polyalkyl phenols having a plurality of the same or different substituents, e.g., ethyl, propyl, butyl and higher alkyl radicals, attached to their nuclei, catechol, tertiary butyl catechol, hydroquinone, tertiary butyl hydroquinone, resorcinol, eugenol, guaiacol, pyrogallol, benzaldehyde, tannic acid, ascorbic acid, isoascorbic acid, phenylene diamine, sym-di-$\beta$-naphthyl-p-phenylene diamine, aniline, and the like. The inhibitor is generally incorporated into the thermosetting polyester resinous composition at the time the reactive polyester resin is dissolved in the monomeric cross-linking material. However, the inhibitor, and particularly inhibitors such as hydroquinone and tertiary butyl catechol, may also be advantageously present during the preparation of the reactive polyester resin itself.

The curing conditions necessary to advance my novel thermosetting polyester resinous compositions to the thermoset state, i.e., to the state of substantial insolubiliy and infusibility, do not differ from those followed in the prior art in curing conventional thermosetting polyester resinous compositions. Thus, curing may be effected at temperatures ranging from about 50° F. to about 260° F., or even higher, either in contact with air or enclosed in a laminating assembly, mold, or the like, as long as the temperature is held below the point at which the composition being cured begins to decompose. Preferably, these catalyzed, resin-forming masses will be cured by heating them in enclosed molds or presses for periods of time ranging from about 2 minutes to about 20 hours.

The novel thermosetting polyester resinous compositions of the present invention are especially suited for use in laminating, in the preparation of adhesives, in molding, and in the preparation of surface coatings and castings. Conventional laminating and molding procedures will be employed, and both filled and unfilled castings are also prepared from these compositions in the conventional manner. Besides curing catalysts and polymerization inhibitors, other known additives, such as ultraviolet light-absorbing compounds, conventional fillers and reinforcements, such as glass fibers, either in woven form, e.g., glass cloth, or in the form of discreet particles, such as chopped fibers or chopped glass cloth, catalyst promoters, mold lubricants, flow promoters, pigments, dyes and the like may also be incorporated prior to final cure.

In order that those skilled in the art may more fully understand the inventive concept presented herein, the following examples are set forth. These examples are given solely by way of illustration, and should not be considered as expressing limitations unless so set forth in the appended claims. All parts and percentages are by weight, unless otherwise stated.

PREPARATION OF THE DIACRYLATE OF POLYETHYLENE GLYCOL 400

To a well agitated solution of 160 parts of polyethylene glycol 400 (average molecular weight—400), 90.9 parts of triethylamine, 125 parts of benzene and 0.02 part of hydroquinone contained in a suitable reaction vessel equipped with thermometer and stirrer there were added dropwise, over a one hour period, 97.6 parts of freshly distilled acrylyl chloride. During this time, the temperature of the reaction mixture was maintained between 25° C. and 30° C. by means of an ice-water bath. Fifteen minutes after the addition of acrylyl chloride was completed, the ice-water bath was removed and the reaction mixture was allowed to come to room temperature. The resulting reaction slurry was filtered to remove 106.5 parts of triethylamine hydrochloride and then vacuum distilled to remove the benzene, leaving 193 parts of a yellow brown syrup of polyethylene glycol 400 diacrylate having an iodine number of 90.5. A sample of this product gave a firm, brittle gel when heated with a catalytic amount of benzoyl peroxide.

*Example I*

Sixty parts of an essentially linear, ethylenically unsaturated alkyd which had previously been prepared by heat-reacting 98 parts of maleic anhydride, 148 parts of phthalic anhydride and 167.2 parts of propylene glycol to an acid number of 40 in the presence of 0.008% of hydroquinone were added to 35 parts of styrene contained in a suitable reaction vessel equipped with thermometer, stirrer and heating and cooling means. The resulting mixture was heated to 90° C. to dissolve the polyester resin and then cooled to 50° C. Next, 5 parts of polyethylene glycol 400 diacrylate were added, with stirring, to give a substantially homogeneous blend which was then admixed with 1% of benzoyl peroxide. The resulting catalyzed blend was poured between two Herculite glass plates separated by one-eighth inch thick rubber gasket material and then cured by heating in a forced-draft oven for 8 hours at 120° F. followed by 6 hours at 125–250° F. and finally 2 hours at 250° F.

The cured coating was tested for tensile strength and percent elongation according to A.S.T.M. test method D–638 and for flexural strength at 25° C. according to A.S.T.M. test method D–790. The results of these tests are given in Table I below.

*Examples II–XV*

Fourteen castings were prepared in the manner described in Example I above, the sole departure from the procedure given therein being that in each case the ethylenically unsaturated monomeric cross-linking material employed was varied as described in Table I below. Tensile strength, percent elongation and flexural strength measurements for each of the castings of Examples II–XV are also given in Table I.

procedures given in Example I, was superior in all respects to the casting obtained from blend B. Furthermore, substantially the same differences in properties were noted when polypropylene glycol 600 dimethacrylate, polypropylene glycol 400 diacrylate and polypropylene glycol 600 diacrylate were substituted for polypropylene glycol 400 dimethacrylate in blend A.

It will be obvious to those skilled in the art that other changes and variations may be made in carrying out the present invention without departing from the spirit and scope thereof as defined in the appended claims.

I claim:
1. A thermosetting polyester resinous composition consisting essentially of:
   (A) a reactive ethylenically unsaturated polyester resin, prepared by reacting an α,β-ethylenically unsaturated polycarboxylic acid and a polyhydric alcohol,

TABLE I

| Example | Cross-Linking Material | Parts [1] | Tensile Strength [2] | Percent Elongation | Flexural Strength at 25° C. [2] |
|---|---|---|---|---|---|
| II | Styrene (control) | 40 | 5,900 | 2.1 | 12,200 |
| I | Polyethylene glycol 400 diacrylate / Styrene | 5 / 35 | 8,500 | 3.2 | 16,000 |
| III | Polyethylene glycol 400 diacrylate / Styrene | 7.5 / 32.5 | 8,900 | 3.6 | 16,900 |
| IV | Polyethylene glycol 400 diacrylate / Styrene | 10 / 30 | 9,900 | 4.3 | 17,500 |
| V | Polyethylene glycol 400 diacrylate / Styrene | 15 / 25 | 11,400 | 6.3 | 18,000 |
| VI | Polyethylene glycol 600 diacrylate / Styrene | 5 / 35 | 8,000 | 3.1 | 14,200 |
| VII | Polyesvylene glycol 600 diacrylate / Styrene | 10 / 30 | 11,000 | 5.1 | 17,100 |
| VIII | Polyethylene glycol 600 diacrylate / Styrene | 15 / 25 | 9,800 | 6.1 | 15,800 |
| IX | Ethylene glycol dimethacrylate / Styrene | 5 / 35 | 7,000 | 2.0 | 12,200 |
| X | Ethylene glycol dimethacrylate / Styrene | 10 / 30 | 6,200 | 1.8 | 12,200 |
| XI | Diethylene glycol dimethacrylate / Styrene | 5 / 35 | 8,400 | 2.6 | 9,600 |
| XII | Diethylene glycol dimethacrylate / Styrene | 10 / 30 | 6,600 | 2.1 | 14,200 |
| XIII | Diethylene glycol dimethacrylate / Styrene | 15 / 25 | 7,100 | 2.2 | 14,200 |
| XIV | Tetraethylene glycol dimethacrylate / Styrene | 5 / 35 | 7,100 | 2.1 | 12,000 |
| XV | Tetraethylene glycol dimethacrylate / Styrene | 10 / 30 | 7,800 | 2.4 | 13,800 |

[1] Per 100 parts of total composition.
[2] In pounds per square inch.

The foregoing comparison of tensile strengths, percent elongation and flexural strengths clearly shows that thermoset polyester resins prepared according to the practice of the present invention (Examples I and III–VIII) are significantly superior in toughness as compared to thermoset polyester resins cross-linked with styrene or with lower glycol or polyglycol dimethacrylates.

*Example XVI*

Two substantially homogeneous blends (A and B) containing:

|  | A, parts | B, parts |
|---|---|---|
| Polyester resin [1] | 70 | 70 |
| Styrene | 30 | 35 |

[1] Maleic anhydride/phthalic anhydride/propylene glycol; mol ratio = 1:1:2.2, respectively; acid no. = 40; inhibited with 0.008% hydroquinone.

were prepared in the manner described in Example I above. Blend A was then admixed with 5 parts of polypropylene glycol 400 dimethacrylate and 1% benzoyl peroxide, blend B with 1% benzoyl peroxide only. The resulting catalyzed blends were then cast and cured in the manner described in Example I. The casting obtained from blend A, when tested for tensile strength, percent elongation and flexural strength according to the (B) a member selected from the group consisting of monomeric diacrylate and dimethacrylate esters of a polyglycol corresponding to the general formula:

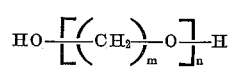

wherein $m$ is an integer of from 2 to 3 and $n$ is a number such that the average molecular weight of said polyglycol is from about 350 to about 850, and
(C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

2. A thermosetting polyester resinous composition consisting essentially of:
   (A) a reactive ethylenically unsaturated polyester resin, prepared by reacting an α,β-ethylenically unsaturated polycarboxylic acid and a polyhydric alcohol,
   (B) a monomeric diacrylate ester of a polyglycol corresponding to the general formula:

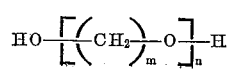

wherein m is an integer of from 2 to 3 and n is a number such that the average molecular weight of said polyglycol is from about 350 to about 850, and (C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

3. A thermosetting polyester resinous composition consisting essentially of:
(A) a reactive ethylenically unsaturated polyester resin, prepared by reacting an α,β-ethylenically unsaturated polycarboxylic acid and a polyhydric aclohol,
(B) a monomeric dimethacrylate ester of a polyglycol corresponding to the general formula:

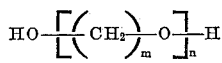

wherein m is an integer of from 2 to 3 and n is a number such that the average molecular weight of said polyglycol is from about 350 to about 850, and
(C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

4. A thermosetting polyester resinous composition consisting essentially of:
(A) a reactive ethylenically unsaturated polyester resin, prepared by reacting an α,β-ethylenically unsaturated polycarboxylic acid and a polyhydric alcohol,
(B) polyethylene glycol 400 diacrylate, and
(C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

5. A thermosetting polyester resinous composition consisting essentially of:
(A) a reactive ethylenically unsaturated polyester resin, prepared by reacting an α,β-ethylenically unsaturated polycarboxylic acid and a polyhydric alcohol,
(B) polyethylene glycol 600 diacrylate, and
(C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

6. A thermosetting polyester resinous composition consisting essentially of:
(A) a reactive ethylenically unsaturated polyester resin, prepared by reacting an α,β-ethylenically unsaturated polycarboxylic acid and a polyhydric alcohol,
(B) polyethylene glycol 400 diacrylate, and
(C) styrene, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

7. A thermosetting polyester resinous composition consisting essentially of:
(A) a reactive ethylenically unsaturated polyester resin, prepared by reacting an α,β-ethylenically unsaturated polycarboxylic acid and a polyhydric alcohol,
(B) polyethylene glycol 600 diacrylate, and
(C) styrene, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

8. A substantially insoluble and infusible polyester resin obtained by polymerizing a composition consisting essentally of:
(A) a reactive ethylenically unsaturated polyester resin, prepared by reacting an α,β-ethylenically unsaturated polycarboxylic acid and a polyhydric alcohol,
(B) a member selected from the group consisting of monomeric diacrylate and dimethacrylate esters of a polyglycol corresponding to the general formula:

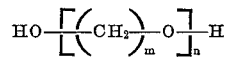

wherein m is an integer of from 2 to 3 and n is a number such that the average molecular weight of said polyglycol is from about 350 to about 850, and
(C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polyerizable reactants present.

9. A substantially insoluble and infusible polyester resin obtained by polymerizing a composition consisting essentially of:
(A) a reactive ethylenically unsaturated polyester resin, prepared by reacting an α,β-ethylenically unsaturated polycarboxylic acid and a polyhydric alcohol,
(B) a monomeric diacrylate ester of a polyglycol corresponding to the general formula:

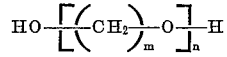

wherein m is an integer of from 2 to 3 and n is a number such that the average molecular weight of said polyglycol is from about 350 to about 850, and
(C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

10. A substantially insoluble and infusible polyester resin obtained by polymerizing a composition consisting essentially of:
(A) a reactive ethylenically unsaturated polyester resin, prepared by reacting an α,β-ethylenically unsaturated polycarboxylic acid and a polyhydric alcohol, (B) a monomeric dimethacrylate ester of a polyglycol corresponding to the general formula:

wherein $m$ is an integer of from 2 to 3 and $n$ is a number such that the average molecular weight of said polyglycol is from about 350 to about 850, and (C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

11. A substantially insoluble and infusible polyester resin obtained by polymerizing a composition consisting essentially of:

(A) a reactive ethylenically unsaturated polyester resin, prepared by reacting an $\alpha,\beta$-ethylenically unsaturated polycarboxylic acid and a polyhydric alcohol, (B) polyethylene glycol 400 diacrylate, and (C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

12. A substantially insoluble and infusible polyester resin obtained by polymerizing a composition consisting essentially of:

(A) a reactive ethylenically unsaturated polyester resin, prepared by reacting an $\alpha,\beta$-ethylenically unsaturated polycarboxylic acid and a polyhydric alcohol, (B) polyethylene glycol 600 diacrylate, and (C) a polymerizable, mono-ethylenically unsaturated cross-linking monomer, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

13. A substantially insoluble and infusible polyester resin obtained by polymerizing a composition consisting essentially of:

(A) a reactive ethylenically unsaturated polyester resin, prepared by reacting an $\alpha,\beta$-ethylenically unsaturated polycarboxylic acid and a polyhydric alcohol, (B) polyethylene glycol 400 diacrylate, and (C) styrene, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

14. A substantially insoluble and infusible polyester resin obtained by polymerizing a composition consisting essentially of:

(A) a reactive ethylenically unsaturated polyester resin, prepared by reacting an $\alpha,\beta$-ethylenically unsaturated polycarboxylic acid and a polyhydric alcohol, (B) polyethylene glycol 600 diacrylate, and (C) styrene, said (B) being present in an amount ranging from about 5% to about 15% by weight, said (C) being present in an amount ranging from about 5% to about 55% by weight, and the total amount of said (B) and said (C) present being from about 20% to about 60% by weight, all percentages being based on the total weight of polymerizable reactants present.

References Cited by the Examiner

UNITED STATES PATENTS

| | | | |
|---|---|---|---|
| 2,884,404 | 4/1959 | Parker | 260—872 |
| 2,957,843 | 10/1960 | Anderson et al. | 260—33.2 |
| 3,042,651 | 7/1962 | Martens | 260—872 |

SAMUEL H. BLECH, *Primary Examiner.*

LEON J. BERCOVITZ, MURRAY TILLMAN,
*Examiners.*